Patented May 23, 1944

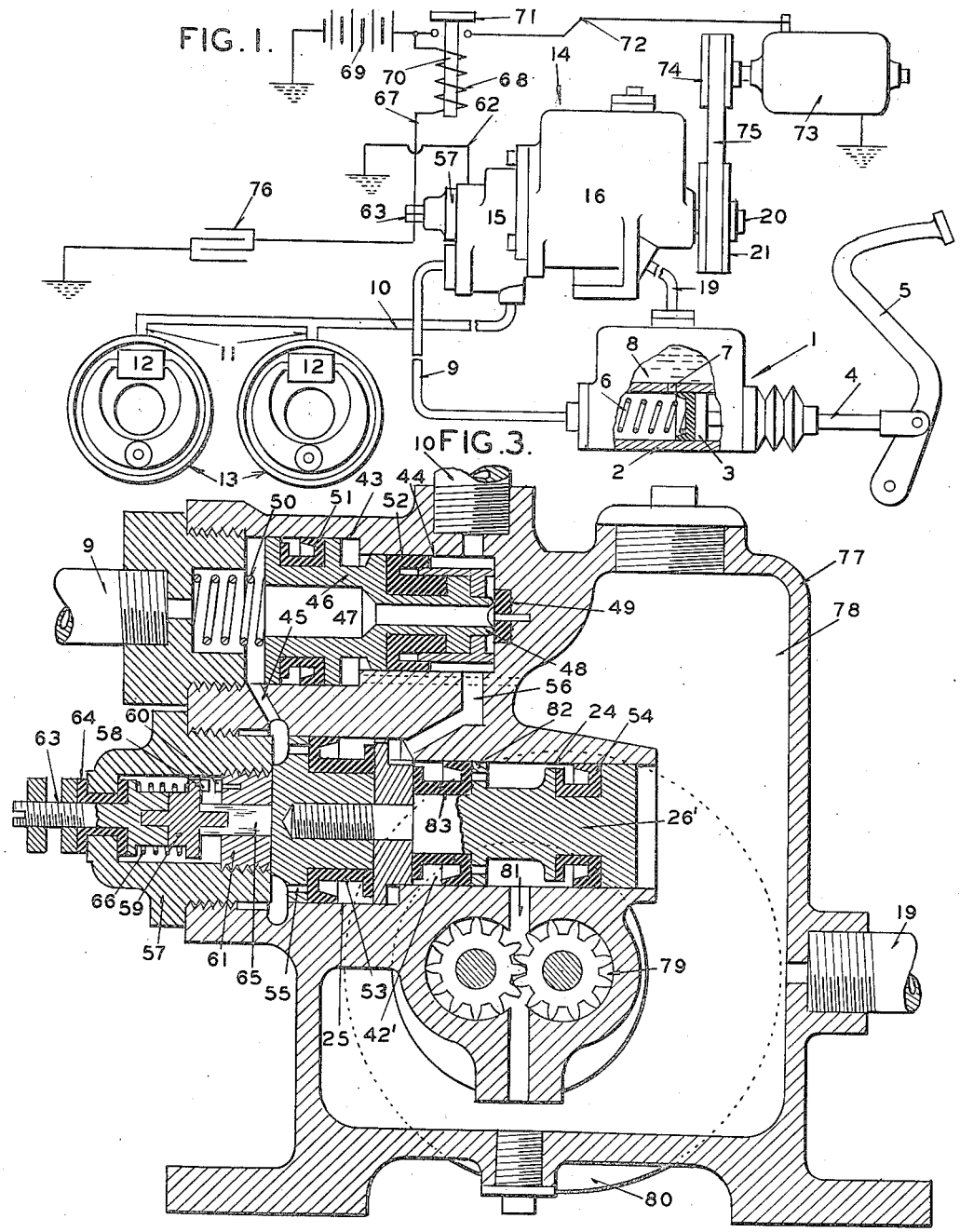

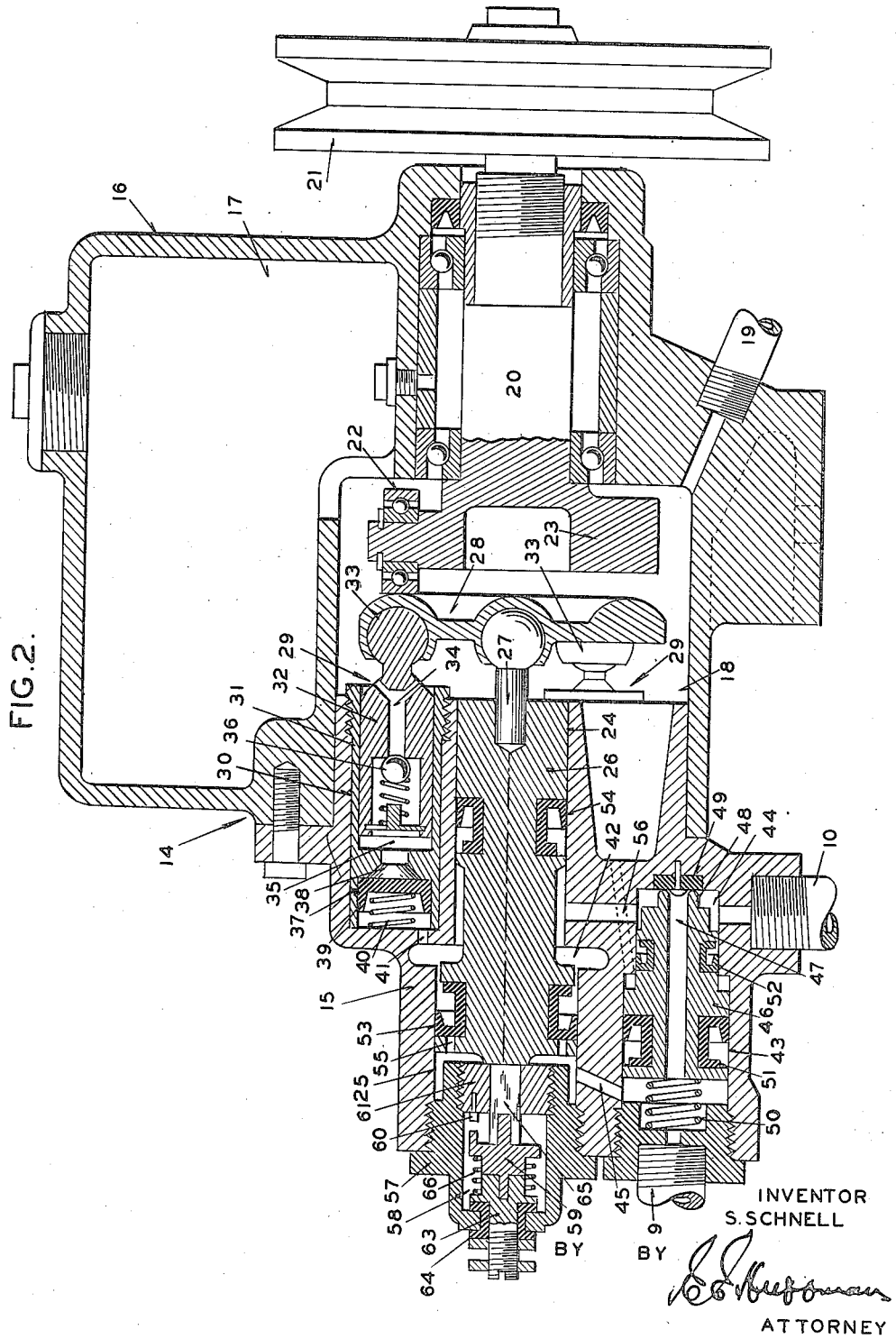

2,349,310

UNITED STATES PATENT OFFICE 2,349,310

PUMP AND CONTROL MEANS THEREFOR

Steve Schnell, Kirkwood, Mo., assignor to Wagner Electric Corporation, St. Louis, Mo., a corporation of Delaware Application May 23, 1942, Serial No. 444,176

10 Claims. (Cl. 60—52)

My invention relates to pumps and control means therefor and particularly to such for use in fluid pressure actuating systems.

One of the objects of my invention is to provide improved means for controlling the operation of a fluid pressure pump which is associated with a fluid pressure actuating system.

Another object of my invention is to provide a motor driven pump for association with a fluid pressure means and control means for the pump which will cause it to be driven by its motor when the fluid pressure system is operated and then only for such a period of time as to develop a predetermined pressure.

Still another object of my invention is to provide improved control means for a fluid pump which is driven by an electric motor, said control means causing the motor to be automatically started when the fluid pressure developed by the pump is desired and automatically stopped when the fluid pressure being developed by the pump reaches a predetermined value.

Other objects of my invention will become apparent from the following description taken in connection with the accompanying drawings in which Figure 1 is a schematic view of a fluid pressure system having a pumping system embodying my invention associated therewith; Figure 2 is a broken sectional view showing details of the pump and control means; and Figure 3 is a sectional view of a different type of pump having my improved control means associated therewith.

Referring in detail to the drawings and first to Figure 1, numeral 1 indicates a master cylinder device which comprises a cylinder 2 having a piston 3 reciprocable therein, said piston being actuated by a piston rod 4 and a pedal 5. The piston 3 is normally biased to its inoperative position by a return spring 6 and when in this position it uncovers a compensating port 7 for placing the cylinder ahead of the piston in communication with reservoir 8. The outlet of the master cylinder is connected by conduits 9 and 10 and branch conduits 11 to fluid motors 12. These fluid motors may be employed to actuate any devices desired and, by way of example, said devices are shown as brakes 13. Interposed between conduits 9 and 10 is my improved combined pump and control means therefor generally indicated by the numeral 14 and shown in detail in Figure 2. This pump and control means is so associated with conduits 9 and 10 that the operation of the driving means for the pump can be controlled by fluid pressure developed by the master cylinder device so that a predetermined greater fluid pressure can be caused to be effective in the fluid motors 12 at which time the driving means will cease to drive the pump. The control arrangement is also such that in the event the pump fails to become operative, the fluid pressure developed by the master cylinder will be effective in the fluid motors.

Referring in detail to Figure 2, the combined pump and control means is embodied in two connected casings 15 and 16, the former being provided with two chambers 17 and 18 which are to be filled with the same operating fluid as that in the master cylinder device. These chambers 17 and 18 are connected with reservoir 8 of the master cylinder by a conduit 19. Thus when chambers 17 and 18 are filled, reservoir 8 will also be filled. A shaft 20 is mounted in suitable bearings in casing 15 and extends to the exterior of the casing where it has a pulley 21 secured thereto. The inner end of shaft 20 projects into chamber 18 and has rotatably mounted thereon a roller 22, the axis of which is at right angles to the axis of the shaft. The inner end of the shaft is also so formed as to have a counter-balancing portion 23 opposite the roller 22.

The other casing 16 has a bore formed to provide axially aligned connecting cylinders 24 and 25 of different diameters. Slidable in these cylinders is a two-diameter piston 26. The smaller end of the two-diameter piston which is positioned in cylinder 24 carries a pin 27 which extends into chamber 18 and pivotally mounted thereon by a ball and socket connection is a swash plate 28 which cooperates with roller 22 carried on shaft 20.

Casing 16 is also provided with a plurality of reciprocating pumps generally indicated by the numeral 29, said pumps being positioned in surrounding relation to the axis of the piston 26 and having their parallel axes equally spaced with respect to each other. In the sectional view shown in Figure 2 only two of these pumps are shown as the section is taken on such a line that the others are cut away. Each of these pumps is mounted within a bore 30 which receives a cylindrical member 31 in which is reciprocably mounted a piston 32 connected to the swash plate by a ball and socket connection 33. The piston has a passage 34 permitting fluid to enter the compressing chamber 35 ahead of the piston and this passage is controlled by an inlet check valve 36 which prevents return flow from the chamber. Carried by the cylindrical member 31 ahead of piston 32 is an outlet check valve 37 in the form of a disc 38 and a rubber cup 39, said disc and cup being normally biased to a seated position by the spring 40. The inner end of the cylindrical member 30 is connected by a port 41 with a chamber 42 surrounding the intermediate reduced portion of piston 26.

In addition to the bore which is provided with cylinders 24 and 25, casing 16 is also provided with another bore formed to provide cylinders 43 and 44 of different diameters. The larger cylinder 43 communicates directly with conduit 9 from the master cylinder device and with the end of large cylinder 25 by means of a passage 45. The end of the smaller cylinder 43 is connected with conduit 10 leading to the fluid motors 12. Within cylinders 43 and 44 is a two-diameter piston 46 having a passage 47 therethrough. The smaller end of this piston is provided with a valve portion 48 for cooperation with a seat 49 for preventing communication through the passage 47. The valve element 48 is normally held seated by a spring 50. The piston 46 carries two packing elements 51 and 52 arranged to prevent passage of fluid past the piston in either direction.

The piston 26 is provided with packing cups 53 and 54, said packing cups being so arranged that fluid in the chamber 42 surrounding the central portion of the piston cannot pass either end of the piston. Fluid, however, is capable of passing the large end of piston 26 to enter chamber 42 by the collapsing of the lip of cup 53. In order to facilitate this passage of fluid, the large end of piston 26 is provided with openings 55. The chamber 42 communicates with conduit 10 leading to the fluid motors by a passage 56 entering the end of the small cylinder 44.

In the particular construction shown the two-diameter piston 26 is so constructed that the fluid pressure present in chamber 42 must be approximately twice that of the fluid pressure acting on the large end of the piston before the pison 26 can be moved to the left. Also, the two-diameter piston 46 is so constructed that the large end of the piston has an area substantially twice that of the small end of the piston. The piston 46 will thus be held in the position shown where valve element 48 is seated as long as the fluid pressure acting on the large end of the piston is substantially half of that acting on the small piston and tending to move the piston to the left.

The outer open end of cylinder 25 is closed by a hollow plug 57 and positioned in this plug is a switch generally indicated by numeral 58. This switch comprises a movable element 59 and a fixed element 60, said latter element being carried by a guide member 61 screwed into the inner end of the plug and connected to ground through the casing and a conductor 62 (see Figure 1). The movable element 59 is mounted on the inner end of a terminal bolt 63 carried by the plug 57 and insulated therefrom by suitable non-conducting material 64. The movable member is adapted to be controlled by a plug 65 carried by the guide member 61 and having one end cooperating with the large end of piston 26. The plug 65 has a loose fit in the guide and is made of any suitable non-conducting material. The spring 66 normally biases the movable contact element 59 toward the fixed contact element.

Referring again to Figure 1, the bolt 63 is connected by a conductor 67 to one end of a solenoid winding 68, said winding having its other end connected to one terminal of a battery 69, the other terminal of said battery being grounded. The armature 70 of the solenoid controls a switch 71 which is interposed in the conductor 72 forming part of the circuit of a grounded electric motor 73. This motor is provided with a pulley 74 whereby it may be connected by means of a belt 75 with the pulley 21 on shaft 20 of the pump. In order to decrease sparking at the switch 58, the bolt 63 is grounded through a condenser 76.

Referring now to the operation of my improved fluid pressure system in which is embodied a pump and control means therefor, the parts of the pump and the master cylinder device are shown in their inoperative condition. The switch 58, under these conditions, will be in an open position due to the fact that the piston 26 is in its extreme left hand position. In this position of the piston the swash plate will be in its vertical position. The open condition of switch 63 will result in switch 71 in the motor circuit also being open due to the fact that the solenoid winding 68 is not energized. The electric motor will thus not be operating and neither will the pump shaft 20 which is connected thereto by the belt.

Should it be desired to apply fluid pressures to the brakes, the brake pedal 5 is actuated. This will result in the port 7 being closed and fluid pressure developed by piston 3. This fluid pressure will be transmitted through conduit 9 into the large cylinders 43 and 25. The fluid pressure acting on the large end of piston 46 will maintain the valve element 48 seated. Fluid pressure acting on the large end of piston 26 will move this piston to the right and thereby cause the pivoted center of the swash plate to be moved toward the end of shaft 20. As piston 26 moves to the right, spring 66 of switch 58 will close this switch and cause the solenoid winding 68 to be energized, thus closing switch 71 of the motor circuit. The motor will now begin to operate, thereby rotating shaft 20. Since the pivoted swash plate has been moved closer to the end of shaft 20, the shaft will so actuate the swash plate in a well-known manner by means of its roller that pistons 32 of the pumps will be progressively reciprocated. Because of the check valves associated with the pumps, the piston will force fluid under pressure in chamber 42 which will be added to that already transmitted to the motors from the master cylinder device, it being noted that as fluid pressure is being built up ahead of the large end of the piston, it will also pass cup 53 and cause pressure in chamber 42, conduit 10 and fluid motors 12 to be built up.

When the fluid pressure developed by the operation of the reciprocating pistons reaches a value which is substantially twice the pressure which has been developed by the master cylinder device, piston 26 will be moved to the left and return to its position shown in Figure 2. At this point, pumping will cease because the pivoted center of the swash plate again reaches such a position that the swash plate can be vertical to the axis of shaft 20 and the roller will merely roll around the surface of said swash plate adjacent its periphery. Simultaneously with the return of the piston 26 to a position where the swash plate will no longer be actuated, the switch 63 will be opened. This will de-energize the solenoid winding, thereby permitting switch 71 of the motor circuit to open and stop the electric motor 73. The pump shaft 20 will now cease to rotate. It will thus be seen that if, for example, the master cylinder has been caused to develop fifty pounds per square inch of pressure, this fifty pounds of pressure will be effective immediately in the system. As a result of development of such pressure, the pump will be caused to operate and place the fluid in the fluid motors under a greater pressure which will be substantially one hundred pounds per square inch. When this pressure is reached, the pump will cease operating and also the electric motor will be stopped. This prevents a drain on the battery and also unnecessary wear of the moving parts. The increasing of fluid pressure in the fluid motors during pump operation will not, however, cause any increase in pedal pressure over that necessary to develop the fifty pounds per square inch.

If it should be desired to increase the pressure in the fluid motors, additional movement of the master cylinder pedal is all that is necessary. The fluid pressure developed by this additional movement of the pedal will again move piston 26 to the right and thereby start the electric motor and cause operation of the pump to such an extent that additional pressure in the fluid motor will be developed until the pressure is substantially twice that developed by the master cylinder.

Although there has been shown and described a structure whereby the fluid pressure developed by the pump and effective in the fluid motors is twice that of the pressure developed by the master cylinder, it is obvious that any ratio between these two pressures may be obtained by merely changing the ratios between the areas of the piston 26 and those of piston 46 which are acted on by fluid under pressure.

Referring to Figure 3, I have shown my invention embodied in a fluid pressure system in which the pump is of the gear type instead of the reciprocating piston type. In this construction similar parts operating in the same manner as those shown in Figure 2 are indicated by the same reference numerals and will not be further described. The structure shown in Figure 3 replaces the pump and control means 14 in the schematic shown of Figure 1. A single casing 77 is provided for the pump and also the cylinders 24, 25, 43 and 44. This casing is provided with a reservoir 78 which is connected to the master cylinder reservoir by conduit 19. Within the bottom portion of the reservoir is mounted the gear pump 79 which is driven by the electric motor through a pulley 80. The outlet 81 of the pump empties into the small cylinder 24 in which is mounted the piston 26'. The portion of this piston 26' between the two ends which carry the packing cups 53 and 54 is provided with a perforated flange 82 which has associated therewith a packing cup 83 so positioned that fluid under pressure developed by the pump can pass into chamber 42' but not return, thus providing a check valve for the outlet of the pump. The fluid entering chamber 42' can pass through the passage 56 to conduit 10 leading to the fluid motors 12. The piston 26' controls the switch 58 which is of the same construction as the one already described in Figure 2.

In the operation of this gear pump and control means, the pistons 46 and 26' will be in the positions shown when the pump is not operating and fluid pressure is not being developed by the master cylinder. When the master cylinder is operating, fluid pressure developed thereby will enter large cylinders 43 and 25 and be effective to move piston 26' to the right. This will close switch 58 and cause the electric motor to begin to operate in a manner already described, thus driving the gear pump 79. The pressure developed by the gear pump will be forced past the packing cup 83 into chamber 42' and from there into the fluid motors. When the pressure developed in the fluid motors is substantially twice that of the pressure developed by the master cylinder device, piston 26' will be moved to the left to the position shown in Figure 3. This will cause opening of switch 58, thereby stopping the motor and causing the pump to cease operating. If the master cylinder is operated to create additional pressure, the switch will again be closed and the pump operated until the pressure in the fluid motors is substantially twice that of the new pressure developed by the master cylinder device. When the master cylinder device is released, the fluid pressure in the fluid motors will be released by movement of piston 46 to the left, thereby opening passage 47 and permitting fluid to return to the master cylinder device, all as described in connection with the structure shown in Figure 2.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure actuating system, a source of fluid pressure, manually-operated means for controlling the effective fluid pressure of the source, a fluid motor, conduit means for placing the source in communication with the fluid motor, a fluid pressure pump having its outlet communicating with the fluid motor, a motor connected for driving the pump, means controlled by fluid pressure from the source made effective by the manually-operated means for causing the pump driving motor to drive the pump, means controlled by a predetermined fluid pressure from the pump for causing the pump driving motor to cease driving the pump, releasing means for fluid pressure in the fluid motor, and means for operating the releasing means to thereby release the pump-developed fluid pressure in the fluid motor when the fluid pressure from the source is released, said releasing means and the means for operating said releasing means functioning without change in the condition of the pump driving motor and the pump existing at the time the pump ceases to be driven.

2. In a fluid pressure actuating system, a source of fluid pressure, a fluid motor, conduit means for placing the source in communication with the fluid motor, a fluid pressure pump having its outlet communicating with the fluid motor, driving means for the pump, electrical means for controlling the driving means and comprising an electrical circuit and a switch, means for closing the switch by fluid pressure from the source, means for opening the switch when the pressure developed by the pump is such that a predetermined ratio exists between it and the fluid pressure from the source, means for decreasing the pump-developed pressure in the fluid motor, and means for operating the last named means by a decrease of the pressure from the source.

3. In a fluid pressure actuating system, a master cylinder device, an actuating fluid motor, conduit means between the master cylinder device and the fluid motor, a fluid pressure pump having its outlet communicating with the fluid motor, an electrical motor for driving the pump, a circuit for the electrical motor including a normally open switch, means for closing said switch when fluid pressure is developed by the master cylinder device, means for re-opening the switch by fluid pressure developed by the pump, releasing means for the fluid pressure in the fluid motor, and means for operating the releasing means to thereby release the pump-developed fluid pressure in the fluid motor when the master cylinder developed fluid pressure is released.

4. In a fluid pressure actuating system, a master cylinder device, an actuating fluid motor, conduit means between the master cylinder device and the fluid motor, a fluid pressure pump having its outlet communicating with the fluid motor, an electrical motor for driving the pump, a circuit for the electrical motor including a switch, a movable member for controlling the switch, said member being subject to the fluid pressures developed by the master cylinder device and by the pump and movable to switch closed position by the fluid pressure developed by the master cylinder device and returned to switch open position when the pump develops a pressure having a predetermined relation to that being developed by the master cylinder device, releasing means for the fluid pressure in the fluid motor, and means controlled by a release of the fluid pressure being developed by the master cylinder device for operating the releasing means to thereby release fluid pressure from the fluid motor.

5. In a fluid pressure actuating system, a source of fluid pressure, a fluid motor, conduit means for placing the source in communication with the fluid motor, a fluid pressure pump having its outlet communicating with the fluid motor, driving means for the pump, electrical means for controlling the driving means and comprising an electrical circuit and a switch, a movable member for controlling the switch, said member being provided with an area subject to the fluid pressure from the source for moving said member to switch closed position and another smaller area subject to the fluid pressure developed by the pump for returning said member to switch open position, releasing means for the fluid pressure in the fluid motor, and means for operating the releasing means comprising a second member having an area subject to the fluid pressure from the source and a smaller area subject to the fluid pressure developed by the pump.

6. In a fluid pressure actuating system, a source of fluid pressure, a fluid motor, conduit means for placing the source in communication with the fluid motor, a fluid pressure pump having its outlet communicating with the fluid motor, an electrical motor for driving the pump, an electrical circuit for the electrical motor comprising an electrical circuit and a switch, a movable member for controlling the switch, said member being provided with an area subject to the fluid pressure from the source for moving said member to switch closed position and another smaller area subject to the fluid pressure developed by the pump for returning said member to switch open position, means for releasing pump-developed fluid pressure from the fluid motor, and means for operating the releasing means comprising a movable member having an area subject to the fluid pressure from the source and a smaller area subject to the pump-developed fluid pressure with said areas having the same ratio as the areas of the first named movable member.

7. In a fluid pressure actuating system, a source of fluid pressure, a fluid motor, conduit means for placing the source in communication with the fluid motor, a pump having its outlet communicating with the motor, a reservoir for the pump, a movable member having an area subject to the fluid pressure developed by the pump and a larger opposing area subject to the fluid pressure from the source, driving means for the pump, control means for causing the driving means to operate the pump and comprising an electrical circuit and a switch, and means for controlling the switch by the fluid pressures acting on the different areas of the movable member to thereby cause the switch to be open or closed, said switch being closed when the force created by the fluid pressure from the source predominates and opened when the force created by the fluid pressure from the pump predominates, means for connecting the fluid motor to the reservoir, and means for causing said last named means to be operative when the fluid pressure from the source is released.

8. In a fluid pressure system, a pump having an outlet, said pump being the reciprocating piston type provided with a swash plate actuating means for operating the pump pistons and a driving member for the swash plate, a movable member for varying the relationship between the pivot of the swash plate and the driving member to thereby control the operation of the pump, an electric motor for driving the driving member of the pump, a circuit for the electric motor including a switch, means for holding said switch open by the member, and fluid pressure means for moving the member to thereby cause the swash plate to be in a pump operating position and the switch to be closed to cause operation of the motor.

9. In a fluid pressure system, a source of fluid pressure, a pump having an outlet, said pump being the reciprocating piston type provided with a swash plate actuating means for operating the pump pistons and a driving member for the swash plate, a movable member for varying the relationship between the pivot of the swash plate and the driving member to thereby control the operation of the pump, an electric motor for driving the driving member of the pump, a circuit for the electric motor including a switch, means for holding said switch open by the member, means for causing fluid pressure from the source to move the member and thereby cause the swash plate to be in a pump operating position and the switch to be closed to cause operation of the motor, and means for returning the member to switch open position by fluid pressure developed by the pump which is proportionally greater than the pressure from the source.

10. In a fluid pressure actuating system, a master cylinder device, an actuating fluid motor, a fluid pressure pump having its outlet communicating with the fluid motor, an electrical motor for driving the pump, a circuit for the electrical motor including a switch, a movable member for controlling the switch, said member being subject to the fluid pressures developed by the master cylinder device and by the pump and movable to switch closed position by the fluid pressure developed by the master cylinder device and returned to switch open position when the pump develops a pressure having a predetermined relation to that being developed by the master cylinder device, and means for releasing the fluid under pressure from the fluid motor by decreasing the fluid pressure in the master cylinder, said releasing means maintaining the same predetermined relationship between the master cylinder pressure and the fluid motor during the releasing period so that any subsequent increase in fluid pressure by the master cylinder will immediately cause re-closing of the switch.

STEVE SCHNELL.